April 23, 1957     M. A. DE PIJPER ET AL     2,790,074
ADDITIVE MIXING CIRCUIT ARRANGEMENT
Filed June 29, 1955
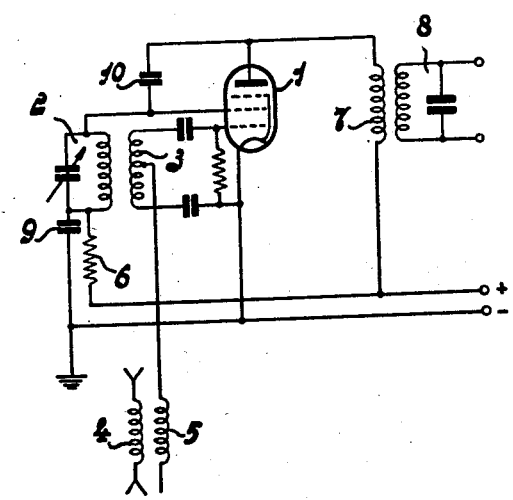
INVENTOR
MARINUS ADRIANUS DE PIJPER
JACOBUS JOHANNES RONGEN
BY
AGENT United States Patent Office 2,790,074
Patented Apr. 23, 1957

2,790,074
ADDITIVE MIXING CIRCUIT ARRANGEMENT

Marinus Adrianus De Pijper and Jacobus Johannes Rongen, Eindhoven, Netherlands, assignors, by mesne assignments, to North American Philips Company, Inc., New York, N. Y., a corporation of Delaware Application June 29, 1955, Serial No. 518,798

Claims priority, application Netherlands July 14, 1954

2 Claims. (Cl. 250—20)

The invention relates to an additive mixing circuit, more particularly for high frequencies, comprising a self-oscillating pentode, at the first grid of which the locally produced oscillations and the incoming oscillations are operative. Such a circuit arrangement is known, in which the second grid of the pentode (the screen-grid) has a positive voltage relative to the cathode and operates as an oscillator anode, the anode circuit comprising a circuit tuned to the intermediate frequency, the output voltage being derived from this circuit. Thus a positive feed-back is obtained between the circuits of the first grid and the second grid, so that oscillations are maintained. One of these circuits comprises a tuned circuit which determines the frequency of the oscillations produced. This circuit is coupled inductively with a feed-back coil included in the anode circuit. The incoming oscillations can be supplied to a point of the circuit or of the feed-back coil, this point being chosen so that the locally produced oscillations are substantially not emitted by the signal input circuit.

A further mixing circuit arrangement of this kind is known which comprises a self-oscillating pentode and in which the oscillator circuit is connected in delta connection between the first two grids of the tube.

The said arrangements have the advantage that the damping of the intermediate-frequency circuit is low, since the internal resistance of the mixing circuit has a high value for the intermediate-frequency signals. It is a disadvantage that the oscillator operation is determined by the generally small screen-grid transconductance of the tube.

There is furthermore known a mixing arrangement, in which the anode circuit of the tube includes a circuit tuned to the locally produced oscillator frequency and coupled inductively with an inductor included in the grid circuit, the incoming oscillations being also fed to the grid circuit. With respect to the first-mentioned arrangement the latter has the advantage that the oscillator operation is determined by the anode transconductance. In this arrangement, however, the intermediate-frequency output circuit is also included in the anode circuit. This circuit may be constituted by an inductor, through which the static anode voltage is supplied and a capacitor included between the anode and the oscillator circuit and serving at the same time as a feed-back capacitor. By means of this capacitor the intermediate-frequency circuit is tuned to the intermediate frequency carrier wave. Such arrangements have, however, the disadvantage that if a triode is used for mixing, the damping of the intermediate-frequency circuit is high, since the internal resistance of the tube is comparatively low.

The invention has for its object to provide a mixing circuit arrangement, in which the disadvantages of the arrangements described above are obviated.

The invention consists in that with an additive mixing circuit arrangement comprising a self-oscillating pentode, to the first grid of which are supplied the locally produced oscillations and the incoming oscillations, the second grid of the tube operating as an oscillator anode, the anode circuit including an inductor, from which the intermediate-frequency oscillations are obtained, a capacitor is connected between the anode and the second grid, the capacity thereof being such that it has a low impedance for oscillations of the oscillator frequency and at the same time tunes the said inductor to the intermediate frequency by way of an electrical path through the elements connected to the second grid and the anode.

For the oscillator frequency the capacitor 10 constitutes a direct connection between the anode and the screen grid, so that the transconductance determining the oscillator operation is much greater than with the mixing arrangements described above, having pentodes. This transconductance is substantially equal to the cathode transconductance. The damping of the intermediate-frequency circuit, however, is lower than with the arrangement comprising a triode, since this damping is determined by the high internal resistance of the pentode.

A circuit tuned to the oscillator frequency is preferably connected between the second grid and the cathode: this circuit is coupled inductively with an inductor connected between the first grid and the cathode. The oscillations to be transformed in frequency are supplied to a point on the last-named inductor, preferably to the center thereof.

The invention will now be described more fully with reference to the drawing.

In the drawing reference numeral 1 designates a pentode and 2 a circuit tuned to the local oscillator frequency. The latter circuit is connected between the grid screen of the tube and the cathode through a capacitor 9, having a comparatively high capacity. This circuit is coupled with a feed-back coil 3 connected via the capacitors between the first grid and the cathode of the tube, so that in the tube oscillations having the oscillator frequency are produced. To one point, preferably the centre of the coil 3, oscillations are supplied, which occur across a circuit 5, which may be connected to an aerial circuit 4. The anode circuit of the tube 1 comprises an inductor 7, which is coupled with a circuit 8 tuned to the intermediate-frequency carrier-wave. The third grid is connected, as usual, to the cathode.

According to the invention a capacitor 10 is connected between the anode and the screen grid, this capacitor accomplishing a double function. It serves in the first place to increase the transconductance of the tube which determines the oscillator operation, so that this operation is improved and in the second place it serves as a tuning capacitor for the coil 7. The impedance of the circuit 2 for the intermediate-frequency oscillation may be neglected, since the oscillator frequency is high relative to the intermediate frequency (for example it may be ten times the latter) and hence the impedance of the parallel-tuned circuit 2 is highest at the oscillator frequency. The capacitor 10 may therefore be considered as being connected effectively in parallel with the coil 7, with which it constitutes a circuit tuned to the intermediate-frequency carrier wave.

The circuit arrangement has been found to be very suitable for use in receivers for higher frequencies (short waves, ultra-short waves and television receivers).

With respect to the intermediate-frequency damping of the arrangement it may be stated that it is determined by the internal resistance of the tube, if this tube is connected as a pentode, since the screen grid is connected to earth for the intermediate-frequency signals.

Owing to the properties of the arrangement, it is extremely suitable for use in receivers in which tubes having a small cathode are used. This is inter alia the case with arrangements comprising battery tubes.

What is claimed is:

1. A self-oscillating additive mixing circuit for producing an intermediate frequency signal, comprising a pentode tube having a cathode, a first grid, a second grid and an anode, a source of an input signal connected to said first grid, a resonant circuit tuned to a self-oscillating frequency and connected between said second grid and said cathode, an inductor connected at an end thereof to said anode, a source of operating voltage supply connected between said cathode and the remaining end of said inductor, and a single capacitor connected directly between said anode and said second grid and having a value of capacitance to resonate with said inductor at said intermediate frequency, the relative values of said inductor and said capacitor being chosen so that said capacitor provides a relatively low impedance at said self-oscillating frequency.

2. A mixing circuit as claimed in claim 1, including an inductor coupled between said first grid and said cathode and inductively coupled to said resonant circuit, said source of an input signal being connected to a point on said last-named inductor.

References Cited in the file of this patent

UNITED STATES PATENTS

| | | |
|---|---|---|
| 2,022,085 | Johnson | Nov. 26, 1935 |
| 2,512,399 | Van Der Knapp | June 20, 1950 |
| 2,616,033 | Adler | Oct. 28, 1952 |
| 2,662,171 | Cock et al. | Dec. 8, 1953 |